(12) United States Patent
Kuroki

(10) Patent No.: US 10,755,034 B2
(45) Date of Patent: Aug. 25, 2020

(54) INFORMATION PROCESSING APPARATUS

(71) Applicant: KONICA MINOLTA, INC., Chiyoda-ku, Tokyo (JP)

(72) Inventor: Jun Kuroki, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/868,009

(22) Filed: Jan. 11, 2018

(65) Prior Publication Data

US 2018/0239746 A1     Aug. 23, 2018

(30) Foreign Application Priority Data

Feb. 17, 2017   (JP) ................................ 2017-027397

(51) Int. Cl.

| | |
|---|---|
| *G06F 17/00* | (2019.01) |
| *G06F 40/166* | (2020.01) |
| *G06F 40/103* | (2020.01) |
| *G06F 40/106* | (2020.01) |
| *G06F 40/109* | (2020.01) |
| *G06T 13/80* | (2011.01) |

(52) U.S. Cl.
CPC .......... *G06F 40/166* (2020.01); *G06F 40/103* (2020.01); *G06F 40/106* (2020.01); *G06F 40/109* (2020.01); *G06T 13/80* (2013.01)

(58) Field of Classification Search
CPC ..... G06F 16/4393; G06F 17/24; G06F 40/166
See application file for complete search history.

(56) References Cited

U.S. PATENT DOCUMENTS

| | | | | |
|---|---|---|---|---|
| 2007/0061717 A1* | 3/2007 | Cragun | ................... | G06F 16/34 715/234 |
| 2010/0223554 A1* | 9/2010 | Tilton | ..................... | G06T 13/80 715/732 |
| 2015/0113368 A1* | 4/2015 | Flider | ..................... | G06T 13/80 715/203 |

FOREIGN PATENT DOCUMENTS

| | | |
|---|---|---|
| JP | 2006243894 A | 9/2006 |
| JP | 2015001961 A | 1/2015 |
| JP | 2015217625 A | 12/2015 |

* cited by examiner

*Primary Examiner* — Andrew T McIntosh
(74) *Attorney, Agent, or Firm* — Holtz, Holtz & Volek PC

(57) ABSTRACT

An information processing apparatus processes an electronic document including operation target data items. The electronic document is controlled by a processor performing an interpreter module which includes a first acquisition instruction for acquiring edit information, a second acquisition instruction for acquiring relevance information, and a generation instruction for generating electronic data from the electronic document based on the edit information and the relevance information. The relevance information includes first selection information for selecting some operation target data item, and second selection information for selecting another operation target data item. The electronic data includes first display data which is displayed based on the some operation target data item, and second display data which is displayed based on the another operation target data item in order that easy-to-read performance of the second display data is decreased to be lower than the first display data.

8 Claims, 16 Drawing Sheets

Fig. 6

| FIRST SELECTION INF. | SECOND SELECTION INF. |
|---|---|
| PROBLEM | SOLUTION |
| INQUIRY | ANSWER |
| QUESTION | CORRECT |
| Q. | A. |
| ? | — |

Fig. 7

| FIRST SELECTION INF. | | SECOND SELECTION INF. | |
|---|---|---|---|
| Feature quantity A | Similarity degree a | Feature quantity B | Similarity degree b |
| Feature quantity C | Similarity degree c | Feature quantity D | Similarity degree d |
| Feature quantity E | Similarity degree e | Feature quantity F | Similarity degree f |
| Feature quantity G | Similarity degree g | Feature quantity H | Similarity degree h |
| Feature quantity I | Similarity degree i | Feature quantity J | Similarity degree j |

Fig. 15

> 1  What is Brainstorming ?
>
> 2  Explanation:
> Brainstorming is a creative development technique by which members exchange opinions to generate a number of ideas and find a solution of a problem. This is based on the concept that further creative ideas can be generated by shocking brains with freewheeling thinking .

Fig. 16

> What is the population of Japan ?
>
> 120 million
>
> SLIDE (1)

*71*

> The most populous country in the world is China with 1,370 million, the second is India with 1,290 million, and the third is U.S.A. with 320 million. Japan ranks tenth, after Russia with 140 million.
> (As of the year 2015)
>
> SLIDE (2)

SLIDE (1) — 71

What is the population of Japan ?

SLIDE (2) — 71

120 million

SLIDE (3) — 71

The most populous country in the world is China with 1,370 million, the second is India with 1,290 million, and the third is U.S.A. with 320 million. Japan ranks tenth, after Russia with 140 million.

(As of the year 2015)

Fig. 18

SLIDE (1)

What is the population of Japan ? — 71

SLIDE (2)

120 million — 71

The most populous country in the world is China with 1,370 million, the second is India with 1,290 million, and the third is U.S.A. with 320 million. Japan ranks tenth, after Russia with 140 million.
(As of the year 2015)

Fig. 19

SLIDE (1)

What is the population of Japan ?

SLIDE (2)

The most populous country in the world is China with 1,370 million, the second is India with 1,290 million, and the third is U.S.A. with 320 million. Japan ranks tenth, after Russia with 140 million.

(As of the year 2015)

120 million

INFORMATION PROCESSING APPARATUS

The entire disclosure of Japanese Patent Application No. 2017-027397 filed on Feb. 17, 2017 is incorporated herein by reference in its entirely.

BACKGROUND

Technological Field

The present invention relates to an information processing apparatus.

Description of the Related Art

It has been proposed to generate electronic data for providing an intended recipient with presentation or reference material which facilitates intuitive understanding of an electronic document by arranging an object such as an image, i.e., operation target data to be operated in a page of the electronic document, and further setting data for providing an animation feature in the operation target data (for example, refer to Japanese Unexamined Patent Application Publication No. 2006-243894, Japanese Unexamined Patent Application Publication No. 2015-001961 and Japanese Unexamined Patent Application Publication No. 2015-217625).

SUMMARY

However, in the case of the prior art technique described in Japanese Unexamined Patent Application Publication No. 2006-243894, when displaying figures as operation target data in which is set data for providing an animation feature in order that the figures are overlapped with each other during displaying, the display state of the operation target data is changed to facilitate understanding the content, order and the like thereof in the recipient side.

Also, in the case of the prior art technique described in Japanese Unexamined Patent Application Publication No. 2015-001961, data is generated to output a representative display form of operation target data as an output product which is changing over time for the purpose of making it possible to understand information about the display form of the operation target data which is changing over time with reference to the output product based on data which is set in the operation target data for providing an animation feature.

Furthermore, in the case of the prior art technique described in Japanese Unexamined Patent Application Publication No. 2015-217625, while suppressing the number of printed sheets as an output product, the development process of the display form of operation target data is printed on the output product by data for providing an animation feature.

Accordingly, in the case of the above prior art techniques, it is impossible to realize the situation that particular information is not explicitly indicated to recipients.

Taking into consideration the above circumstances, it is an object of the present invention therefore to realize the situation that particular information is not explicitly indicated to recipients.

To achieve at least one of the abovementioned objects, according to an aspect of the present invention, an information processing apparatus processes an electronic document including a plurality of operation target data items to be operated, wherein the electronic document is controlled by one or more processor, wherein the one or more processor performs an interpreter module stored in a memory, wherein the interpreter module includes a first acquisition instruction which is used to acquire edit information of the plurality of operation target data items, a second acquisition instruction which is used to acquire relevance information of the plurality of operation target data items, and a generation instruction which is used to generate electronic data from the electronic document based on the edit information acquired by the first acquisition instruction and the relevance information acquired by the second acquisition instruction, wherein the relevance information includes first selection information which is used to select some operation target data item from among the plurality of operation target data items, and second selection information which is associated with the first selection information and used to select another operation target data item from among the plurality of operation target data items, and wherein the electronic data is used as display data and includes first display data which is displayed based on the some operation target data item selected by the first selection information, and second display data which is displayed based on the another operation target data item selected by the second selection information in order that easy-to-read performance of the second display data is decreased to be lower than the first display data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6 is a schematic diagram for showing one example of a table specifying relevance information.

FIG. 7 is a schematic diagram for showing another example of a table specifying the relevance information.

FIG. 15 is a schematic view for showing an example of the complementary relation between a term and its explanation.

FIG. 16 is a schematic view for showing an example of display data 71 including two slides.

FIG. 17 is a schematic view for showing an example of display data 71 including three slides.

FIG. 18 is a schematic view for showing an example of display data 71 of slides including objects to be displayed later which are aggregated in the next page.

FIG. 19 is a schematic view for showing an example of display data 71 of slides including an object to be displayed later which is located in a blank space X of the next page.

DETAILED DESCRIPTION OF THE EMBODIMENTS

Hereinafter, one or more embodiments of the present invention will be described with reference to the drawings. However, the scope of the invention is not limited to the disclosed embodiments. Also, throughout the present disclosure of the present embodiment, explanation using the words "process", "arithmetic operation", "calculation", "determination", "representation" or the like is related to the operation or process of a computer system or a similar electronic computer apparatus in which data represented by a physical quantity in a register or the like of the computer system is converted or processed as other data which is similarly represented by a physical quantity.

Figure 1:
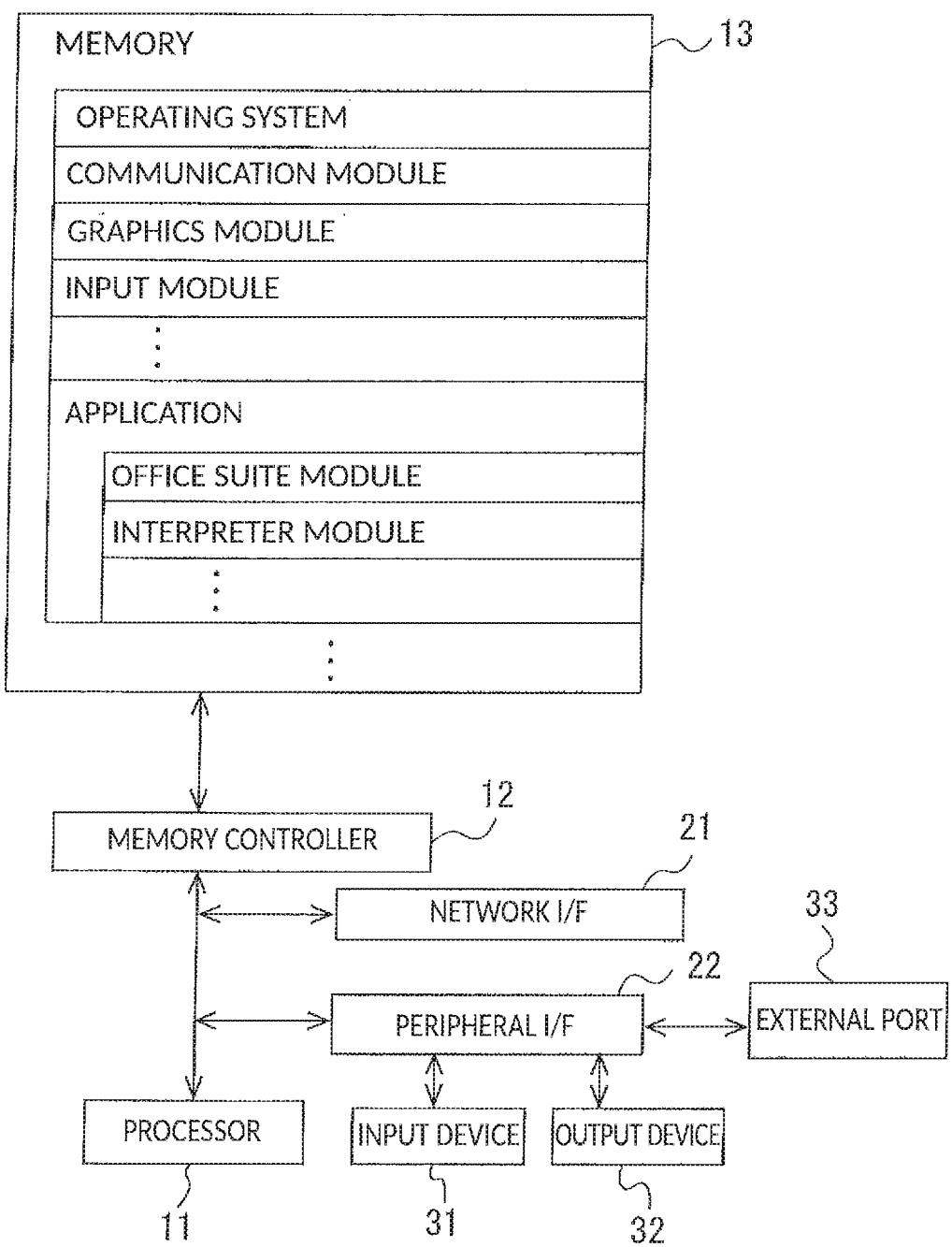
FIG. 1 is a view for showing an exemplary structure of an information processing apparatus 1 in accordance with the present embodiment.

FIG. 1 is a view for showing an exemplary structure of an information processing apparatus 1 in accordance with the present embodiment. The information processing apparatus 1 is provided with one or more processor 11, a memory controller 12, a memory 13, a network interface 21 and a peripheral interface 22. The information processing apparatus 1 may be provided with an input device 31, an output device 32 or one or more external port 33 connectable through the peripheral interface 22. These components such as the one or more processor 11, the memory controller 12, the memory 13, the network interface 21, the peripheral interface 22, the input device 31, the output device 32 and the external port 33 can be communicated through one or more signal bus or a communication line. These components can be implemented as hardware, software or a combination thereof including one or more signal processing or application specific integrated circuit. The memory 13 is implemented with a nonvolatile memory, a magnetic disc storage device or the like, and controlled by the memory controller 12 in accordance with access from the processor 11, the peripheral interface 22 or the like.

The peripheral interface 22 serves to logically connect the input device 31, the output device 32 or the external port 33 with the processor 11 and the memory 13. The one or more processor 11 runs various software stored in the memory 13 to perform various functions and process various types of data. Incidentally, the peripheral interface 22, the processor 11 and the memory controller 12 can be implemented with a single chip or dedicated chips provided respectively.

The memory 13 stores software components, i.e., an operating system, a communication module, a graphic module, an input module, an application module and so forth. The operating system is implemented with a variety of software components and the like for controlling and managing system tasks such as management and control of the memory 13 by performing communication among the software components. The communication module implements communication with other devices through the one or more external port 33. The external port 33 is, for example, a universal serial bus through which other devices are directly or indirectly connected. The graphic module is implemented with a software component which renders and displays graphics on the output device 32 such as a display device. The graphics include text, Web pages, icons, animation and the like objects which can be displayed to users. The input module functions as an input interface through which user's operations are input to various applications.

The object is a display letter or an image such as text, a numeral or a punctuation mark or the like which can be selected by a user through operation of the input device 31 or the like. For example, character strings are displayed as the objects on the output device 32 such as a display device, and one of the objects is highlighted by a series of user's operations to select the highlighted object.

The applications may include office suite modules, interpreter modules or a subset thereof. The office suite modules enable document preparation, table calculation or the like and are generally used in every situation such as office work, education, or in home. Typical examples of the office suite modules are Word (registered trademark), Excel (registered trademark), PowerPoint (registered trademark) and the like of Microsoft (registered trademark) Office. On the other hand, there are distributed a plurality of modules such as Apache OpenOffice which provides similar functions. Microsoft (registered trademark) Office and Apache OpenOffice are standardized by standard organizations respectively as file formats thereof such as OOXML (OfficeOpenXML) and ODF (OpenDocument Format) which are supported by a number of compatible applications.

Animation features can be added to a file which is created by PowerPoint (registered trademark) in the OOXML format. The interpreter module analyzes a variety of electronic documents created by the office suite modules to generate electronic data, and executed by the one or more processor 11.

Figure 2:
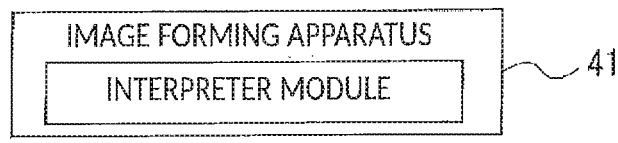
FIG. 2 is a schematic diagram for showing one example of an image forming apparatus 41 in which an interpreter module is implemented.
Figure 3:
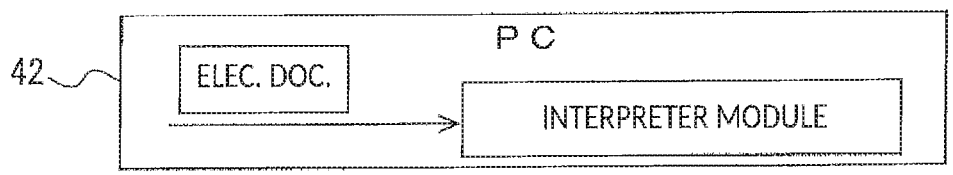
FIG. 3 is a schematic diagram for showing one example of a PC 42 in which an interpreter module is implemented.
Figure 4:
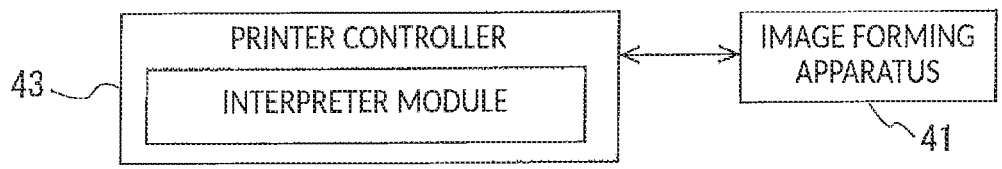
FIG. 4 is a schematic diagram for showing one example of a printer controller 43 in which an interpreter module is implemented.
Figure 5:
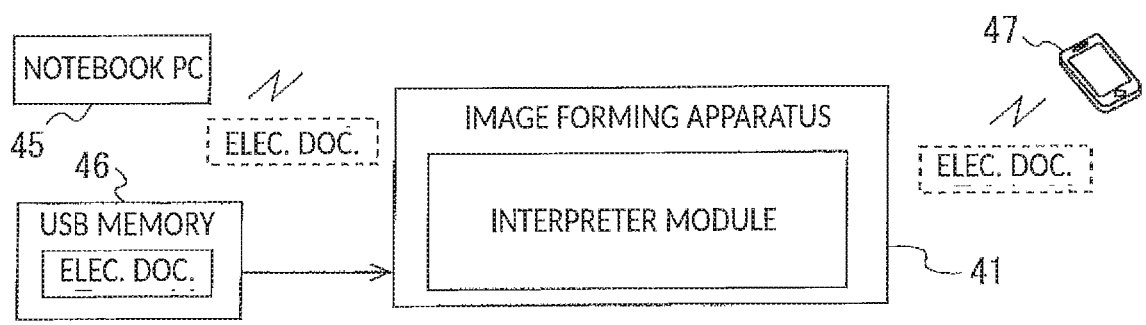
FIG. 5 is a schematic diagram for showing one example of an electronic document which is provided from outside.

FIG. 2 is a schematic diagram for showing one example of an image forming apparatus 41 in which an interpreter module is implemented. The interpreter module implemented in the image forming apparatus 41 can print electronic data on a medium. FIG. 3 is a schematic diagram for showing one example of a PC 42 in which an interpreter module is implemented. The interpreter module implemented in the PC 42 can parse, execute and display electronic data which is edited by the PC 42. FIG. 4 is a schematic diagram for showing one example of a printer controller 43 in which an interpreter module is implemented. The interpreter module implemented in the printer controller 43 can provide the image forming apparatus 41 with electronic data which is processed as a raster image. FIG. 5 is a schematic diagram for showing one example of an electronic document which is provided from outside. An electronic document provided from a notebook PC 45 through a wireless medium is converted to electronic data by the interpreter module implemented in the image forming apparatus 41. An electronic document stored in an external storage device such as a USB memory 46 or an electronic document transferred from an external terminal such as a smartphone 47 is processed in the same manner.

Namely, an electronic document is processed by the one or more processor 11 which invokes the interpreter module stored in the memory 13. The interpreter module includes a first acquisition instruction, a second acquisition instruction and a generation instruction. The first acquisition instruction is used to acquire edit information of a plurality of operation target data items. The operation target data items are objects such as characters, figures or images to be arranged in a page of an electronic document, and a user can select the object by operating the input device 31. The second acquisition instruction is used to acquire relevance information of a plurality of operation target data items. The generation instruction is used to generate electronic data from an electronic document based on the edit information acquired by the first acquisition instruction and the relevance information acquired by the second acquisition instruction. The relevance information includes first selection information and second selection information. The first selection information is used to select some operation target data item from among the plurality of operation target data items. The second selection information is associated with the first selection information, and used to select another operation target data item from among the plurality of operation target data items.

FIG. 6 is a schematic diagram for showing one example of a table specifying the relevance information. The first selection information includes a keyword which is included in an object to be displayed first from among a plurality of objects, and corresponds to a question object. The first selection information includes, for example, "problem", "inquiry", "question", "Q", "?" and so forth. The second selection information includes a keyword which is included in an object to be displayed later from among the plurality of objects, and corresponds to an answer object. The second selection information includes, for example, "answer", "correct", "A.", "–", i.e., non-set, and so forth. In other words, the object including a keyword of the first selection information is an object of a "question", and the object including the keyword of the second selection information is an object of an "answer". Accordingly, if an object includes a keyword of the second selection information and has an animation feature, this object is operated after an object including a keyword of the first selection information so that it is desired to perform an edit process for realizing the situation that particular information is not explicitly indicated to recipients.

Meanwhile, the first selection information and the second selection information can be managed by different tables respectively. Also, the first selection information and the second selection information can be prepared such that a keyword is set as an initial value, and that it is possible to modify, add or delete keywords accordingly. The first selection information and the second selection information may be updated accordingly by deep learning or the like.

Also, if the object to be displayed first or the object to be displayed later includes a keyword of the first selection information or the second selection information, the object to be displayed later is an editing target, and an edit process is performed. On the other hand, if neither the object to be displayed first or the object to be displayed later includes a keyword of the first selection information or the second selection information, the edit process of the object is not performed, and electronic data is generated from electronic document.

FIG. 7 is a schematic diagram for showing another example of a table specifying the relevance information. The first selection information specifies the shape of an object to be displayed first from among a plurality of objects. The first selection information includes feature quantities A, C, E, G, I and the like which are given similarity degrees a, c, e, g, i and the like respectively. On the other hand, the second selection information specifies the shape of an object to be displayed later from among a plurality of objects. The second selection information includes feature quantities B, D, F, H, J and the like which are given similarity degrees b, d, f, h, j and the like respectively. For example, if an object is specified by the feature quantities B, D, F, H, J or the like of the second selection information and has an animation feature, this object is operated after an object specified by the feature quantities A, C, E, G, I or the like of the first selection information so that it is desired to perform an edit process for realizing the situation that particular information is not explicitly indicated to recipients.

Incidentally, the first selection information and the second selection information may be sound information. For example, the first selection information and the second selection information may be composed of basic patterns of response and so forth. Also, for example, the first selection information and the second selection information may be a set of sound information items which are arranged in order in accordance with a certain rule such as typical progression of chords included in music scores.

Furthermore, the first selection information can be nested structures in at least either of the first selection information and the second selection information. This is true for the second selection information. Namely, it is only required that association based on a certain rule is derived between the first selection information and the second selection information.

Figure 8:
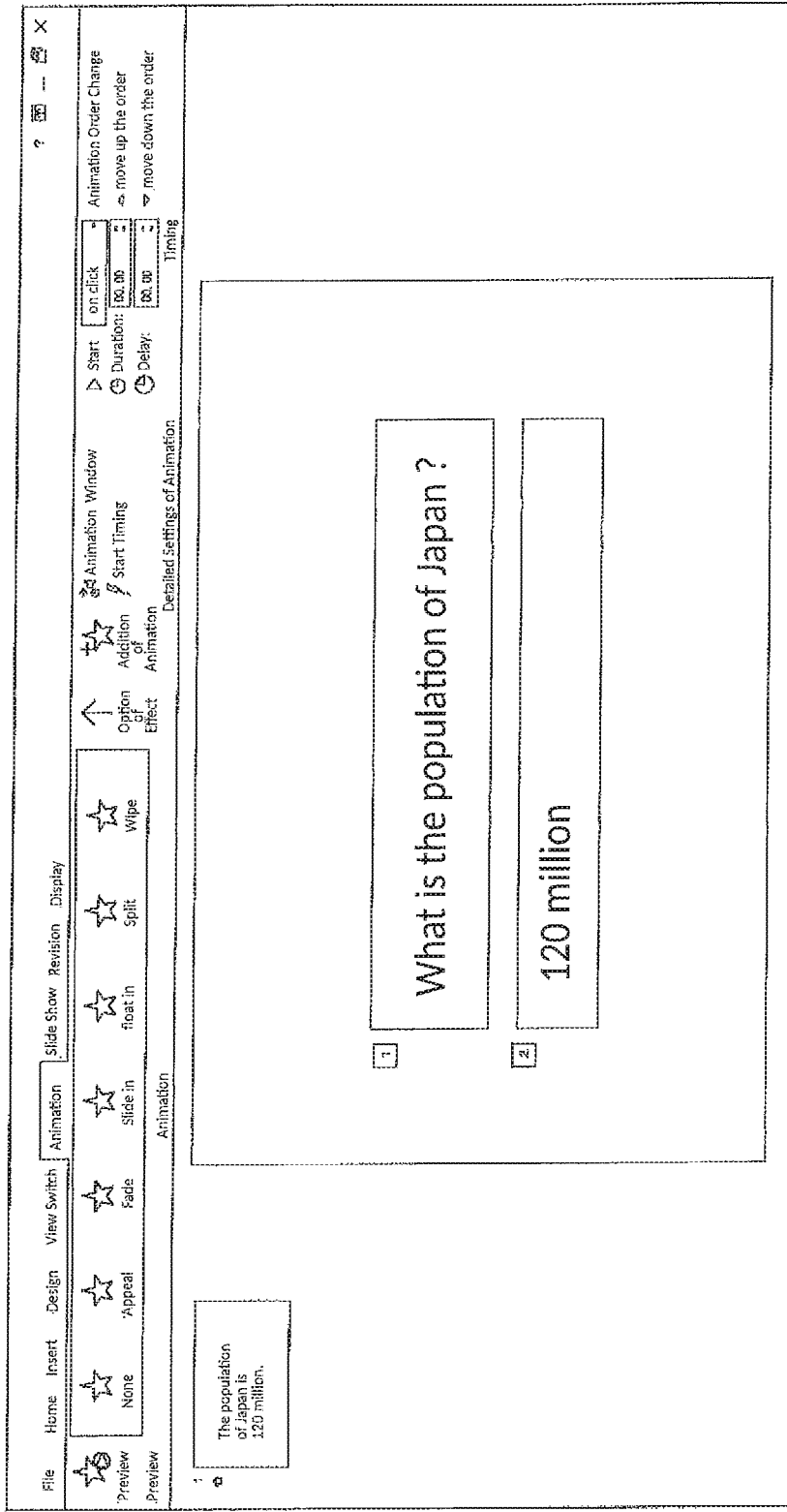
FIG. 8 is a schematic view for showing an example of an editing environment of an electronic document.
Figure 9:
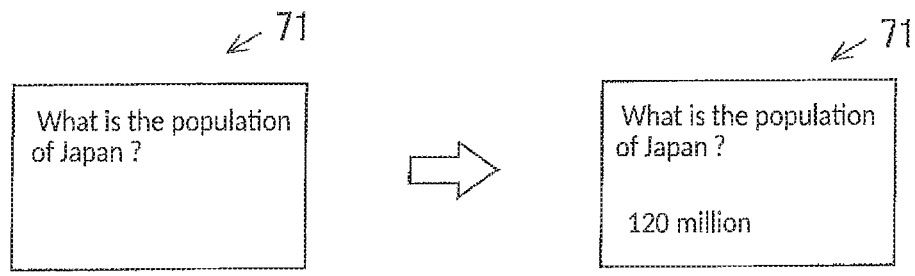
FIG. 9 is a schematic view for showing an example of an animation.

FIG. 8 is a schematic view for showing an example of an editing environment of an electronic document. FIG. 9 is a schematic view for showing an example of an animation. As shown in FIG. 8, an electronic document is provided with an animation feature which is given to an object, such as move, appearance, deletion and the like in a slide by a presentation creation software such as PowerPoint (registered trademark) of Microsoft (registered trademark). The order of behavior of objects, which are given an animation feature, is controlled by associating anteroposterior relation with the objects. When such an animation feature is used to prepare a reference for presentation, it is sometimes considered to put a question to an audience as recipients. For example, after putting a question on an upper area of a slide as "What is the population of Japan?", an answer as the next action may be displayed or appear on a lower area of the slide as "120 million".

Namely, as illustrated in FIG. 9, an object containing "What is the population of Japan?" and converted to display data 71 is set to be displayed first, and then an object containing "120 million" and converted to display data 71 is set to be displayed second by operating the input device 31 such as a mouse or a keyboard. These two objects which can be operated are included in the same slide. When the presentation file created in this manner is directly printed, all the objects in the slide are printed in the same sheet. Accordingly, in the case of a lecture or the like where a printed reference has been distributed in advance, when the question is displayed in a screen, an audience can find the answer printed in the printed reference so that it is meaningless to put the question to the recipient.

For this reason, the object to be displayed later is processed by an edit process. Specifically, electronic data is used as the display data 71 and includes first display data and second display data. The display data 71 is used to display at least one of text, a numeral or a punctuation mark as a display letter(s). The first display data is displayed based on some of operation target data items which is selected by first selection information. The second display data is displayed based on another operation target data item which is selected by second selection information in order that the easy-to-read performance of the second display data is decreased to be lower than the first display data.

Specifically, the easy-to-read performance of the second display data is lowered in terms of at least one of visibility, readability and legibility. The visibility is determined based on differences between display letters and the background color of the display letters in at least one of brightness, saturation and hue. The readability is determined based on at least one of the size of display letters, the space between the display letters and the shape of the display letters. The legibility is determined at least based on the style of display letters.

Meanwhile, in the case of the example shown in FIG. 9, "What is the population of Japan?" corresponds to the first display data, and "120 million" corresponds to the second display data.

The edit information includes animation information for setting the motion of an object. The animation information can be set to each of the plurality of operation target data items to create an apparent motion. The animation information includes display order information and motion information. The display order information is used to specify the order of displaying the plurality of operation target data items respectively. The motion information is used to specify the motions of the plurality of operation target data items displaying order of which are set based on the display order information. The electronic data is thereby generated based on an operation target data item, to which is set animation information included in the edit information, from among the plurality of operation target data items.

Also, the edit information includes the attribute information of each of the plurality of operation target data items. The attribute information indicates whether or not at least the plurality of operation target data items include text information. The electronic data is thereby generated based on an operation target data item, in which is included text information, from among the operation target data items to which is set animation information. The first selection information included in the relevance information is used to specify one or more letter. The second selection information included in the relevance information is used to specify one or more letter having a complementary meaning to the meaning indicated by the first selection information.

Incidentally, the electronic data is created in the same format as or a different format than the electronic document. For example, since an electronic document created by an office suite is created as a file in the OOXML format, if an electronic data is created in the same format as the electronic document, the electronic data is created as a file in the OOXML format. On the other hand, there are a variety of formats which are different than the format in which an electronic document is created. For example, the electronic data is created as a file in the PDF format.

Figure 10:
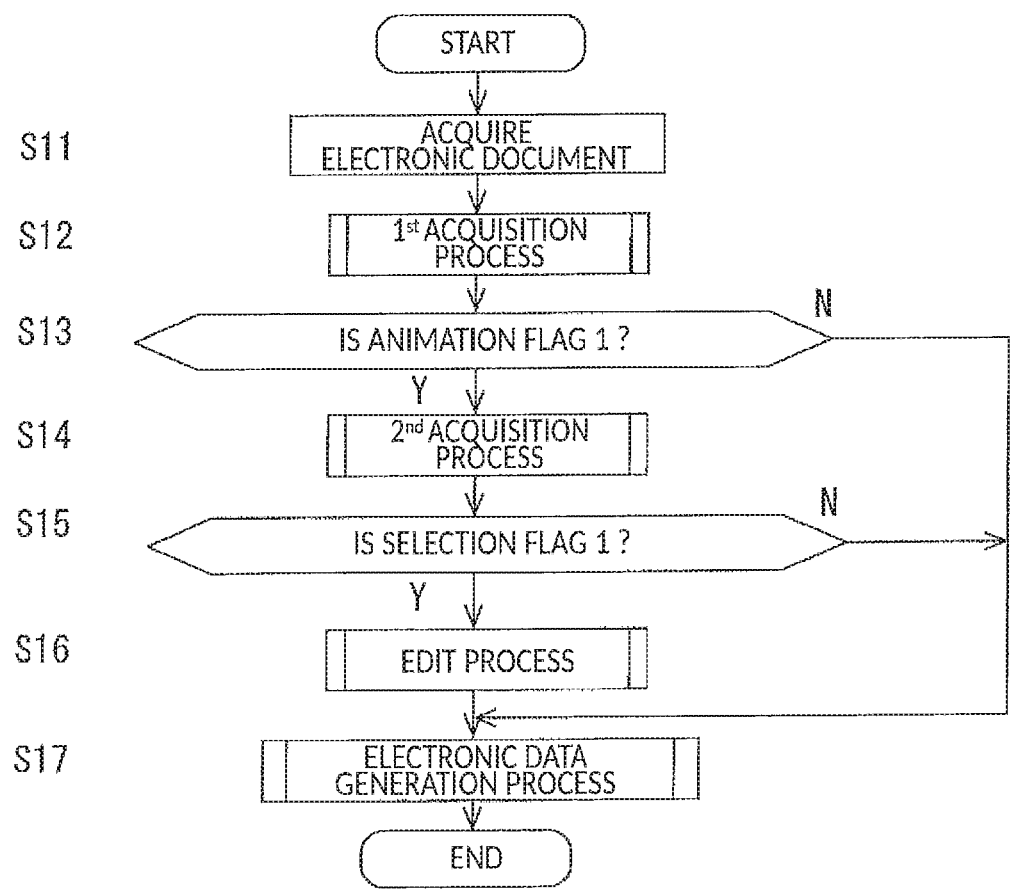
FIG. 10 is a flow chart for explaining a control example of the information processing apparatus 1.

FIG. 10 is a flow chart for explaining a control example of the information processing apparatus 1. In step S11, an electronic document is acquired. The electronic document is, for example, a file in the OOXML format created by an office. However, the electronic document may not be a file in the OOXML format. For example, the electronic document may be created from data which is obtained by reading an original by an OCR or an ICR (intelligent character recognition).

In step S12, a first acquisition process is performed. The first acquisition process is a process which is performed by the first acquisition instruction for acquiring the edit information of the plurality of operation target data items. The first acquisition process will be described later in detail. In step S13, it is determined whether or not an animation flag is 1. If it is determined that the animation flag is 1 (Y in step S13), the process proceeds to step S14. Conversely, if it is determined that the animation flag is not 1 (N in step S13), the process proceeds to step S17.

In step S14, a second acquisition process is performed. The second acquisition process is a process which is performed by the second acquisition instruction for acquiring the relevance information of the plurality of operation target data items. The second acquisition process will be described later in detail. In step S15, it is determined whether or not a selection flag is 1. If it is determined that the selection flag is 1 (Y in step S15), the process proceeds to step S16. Conversely, if it is determined that the selection flag is not 1 (N in step S15), the process proceeds to step S17. In step S16, an edit process is performed. The edit process will be described later in detail. In step S17, an electronic data generation process is performed, and the process is terminated. The electronic data generation process will be described later in detail.

Figure 11:
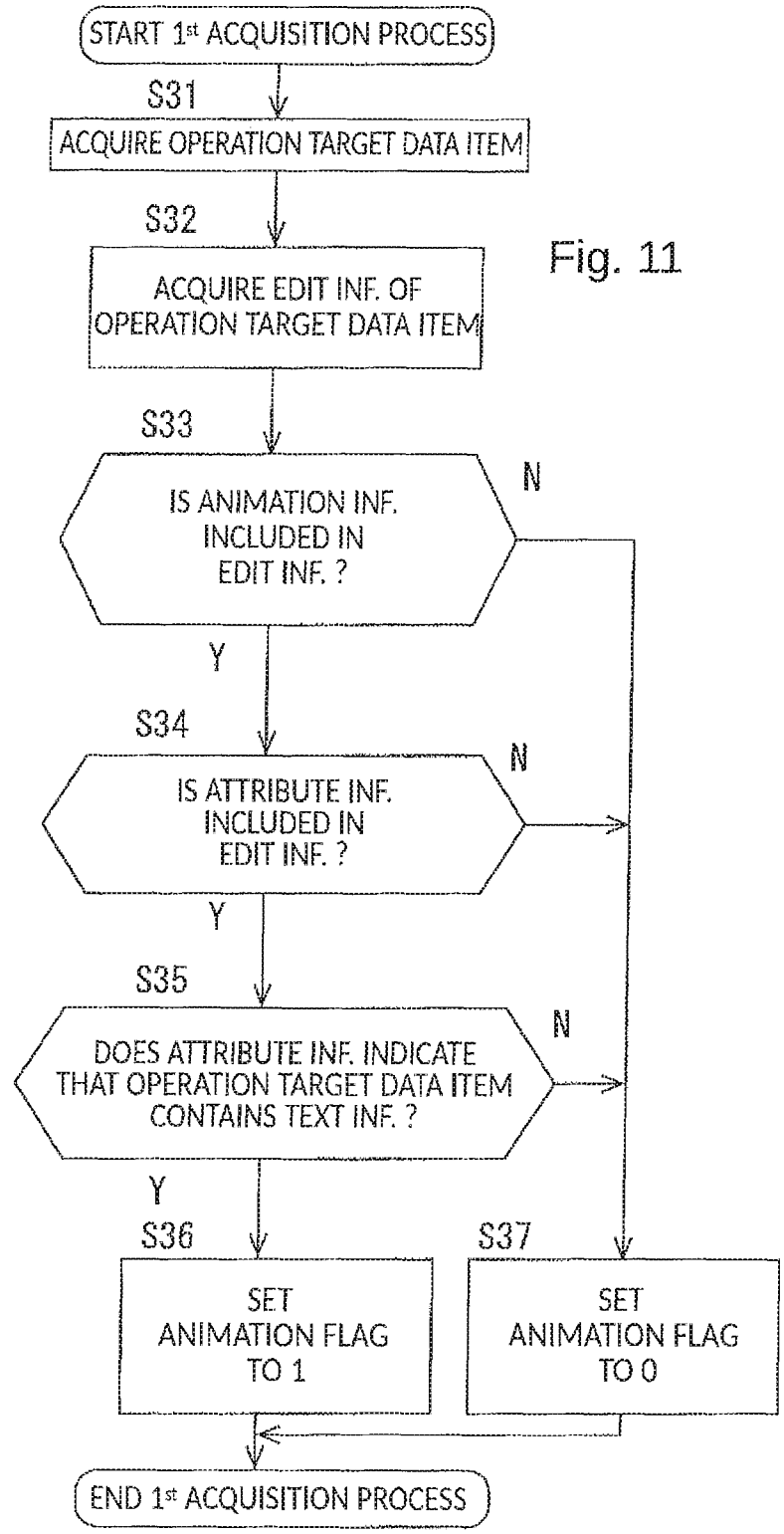
FIG. 11 is a flow chart for explaining an example of a first acquisition process.

FIG. 11 is a flow chart for explaining an example of the first acquisition process. In step S31, an operation target data item included in an electronic document is acquired. In step S32, edit information of the operation target data item is acquired. In step S33, it is determined whether or not animation information is included in the edit information. If animation information is included in the edit information, the process proceeds to step S34. Conversely, if animation information is not included in the edit information, the process proceeds to step S37.

Incidentally, if animation information is included in the edit information, animation is set to the operation target data item so that the object to be displayed later is operated to appear, disappear, move, blink and so forth in response to operation of the input device 31 such as a mouse or a keyboard or completion of animation of the object to be displayed first as a trigger.

In step S34, it is determined whether or not attribute information is included in the edit information. If it is determined that attribute information is included in the edit information, the process proceeds to step S35. Conversely, if it is determined that attribute information is not included in the edit information, the process proceeds to step S37. In step S35, it is determined whether or not the attribute information indicates that an operation target data item includes text information. If it is determined that the attribute information indicates that an operation target data item includes text information, the process proceeds to step S36. Conversely, it is determined that the attribute information does not indicate that an operation target data item includes text information, the process proceeds to step S37. In step S36, an animation flag is set to 1. In step S37, the animation flag is set to 0.

Namely, if the plurality of operation target data items include an operation target data item to which animation information is set and in which text information is included, the process proceeds to the step in which it is determined whether or not there is relevance between the operation target data items.

Figure 12:
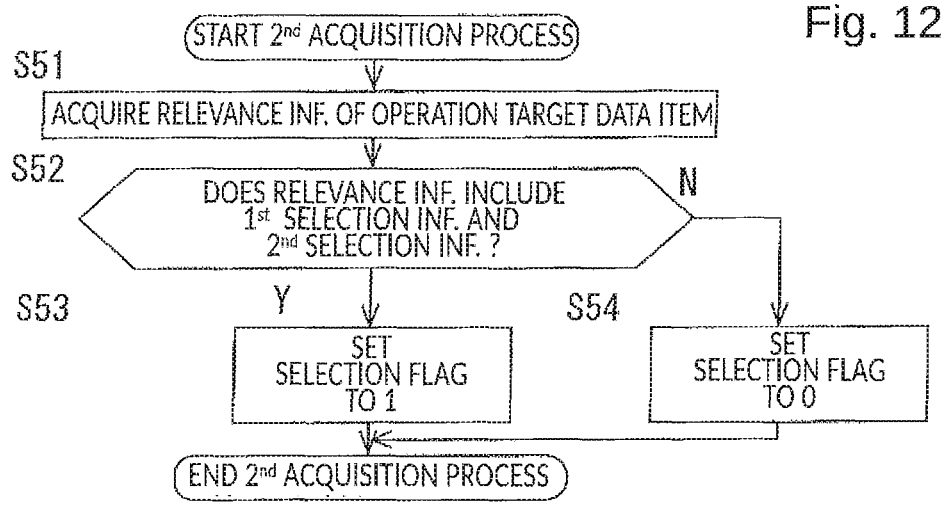
FIG. 12 is a flow chart for explaining an example of a second acquisition process.

FIG. 12 is a flow chart for explaining an example of the second acquisition process. In step S51, relevance information of an operation target data item is acquired. In step S52, it is determined whether or not the relevance information includes the first selection information and the second selection information. If it is determined that the relevance information includes the first selection information and the second selection information, the process proceeds to step S53. Conversely, if it is determined that the relevance information does not contain the first selection information and the second selection information, the process proceeds to step S54. In step S53, the selection flag is set to 1. In step S54, the selection flag is set to 0.

Figure 13:
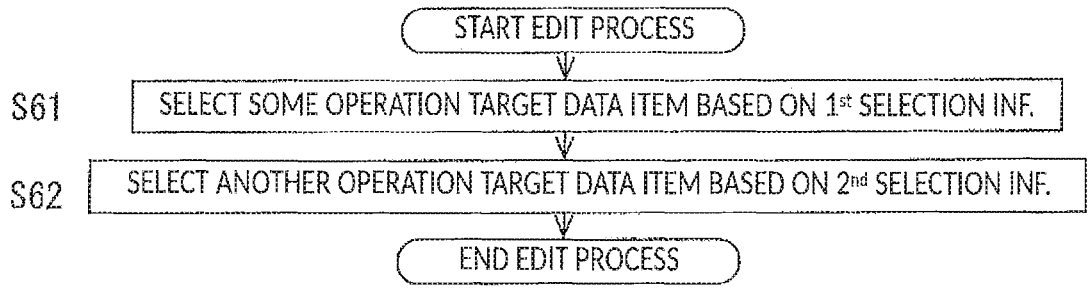
FIG. 13 is a flow chart for explaining an example of an edit process.

FIG. 13 is a flow chart for explaining an example of the edit process. In step S61, some operation target data item is selected from among the plurality of operation target data items based on the first selection information. In step S62, another operation target data item is selected from among the plurality of operation target data items based on the second selection information. Incidentally, the operation target data item selected based on the first selection information may be an item having a meaning equivalent to the first selection information. For example, such an item need not exactly match the term "problem" included in the first selection information, but only need to have the same meaning. Specifically, even if it is determined that the term "problem" itself is not included in the operation target data items, as a result of analyzing the plurality of operation target data items, which are included in an electronic document, by natural language processing, it can be assumed that the term "problem" is included if there is included a term corresponding to the term "problem" while taking the context into consideration.

Figure 14:
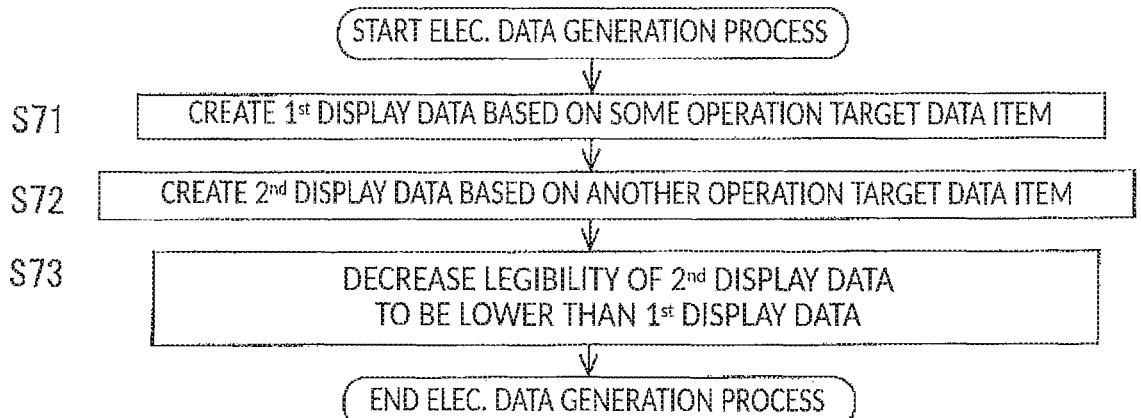
FIG. 14 is a flow chart for explaining an example of an electronic data generation process.

FIG. 14 is a flow chart for explaining an example of the electronic data generation process. In step S71, first display data is created based on some operation target data item. In step S72, second display data is created based on another operation target data item. In step S73, the easy-to-read performance of the second display data is decreased to be lower than the first display data. Incidentally, step S72 and step S73 can be concurrently performed.

FIG. 15 is a schematic view for showing an example of the complementary relation between a term and its explanation. The object located in an upper area of the slide is an object to be displayed first. On the other hand, the object located in a lower area of the slide is an object to be displayed later. In FIG. 15, the object to be displayed first is a term, and the object to be displayed later is an explanation. There is a relation between these objects in that these objects are paired with each other. Incidentally, the relevance information between objects may be meta information such as line feed or page feed which causes a change thereacross. Namely, the relevance information between objects may be included at least one of the object to be displayed first, the object to be displayed later and meta information which connects therebetween.

FIG. 16 is a schematic view for showing an example of display data 71 including two slides. In FIG. 16, the object as an operation target data item is included in a slide (1). FIG. 17 is a schematic view for showing an example of display data 71 including three slides. Since the object as an operation target data item is included in a slide (2), the audience as recipients cannot see an answer included in the slide (2) when the audience sees a slide (1). FIG. 18 is a schematic view for showing an example of display data 71 of slides including objects to be displayed later which are aggregated in the next page. In FIG. 18, the object as an operation target data item is included in a slide (2), and the contents in two slides are aggregated in a single slide, i.e., the slide (2). Accordingly, the audience as recipients cannot see an answer included in the slide (2) when the audience sees a slide (1), and the number of sheets is prevented from increasing.

Figure 20:
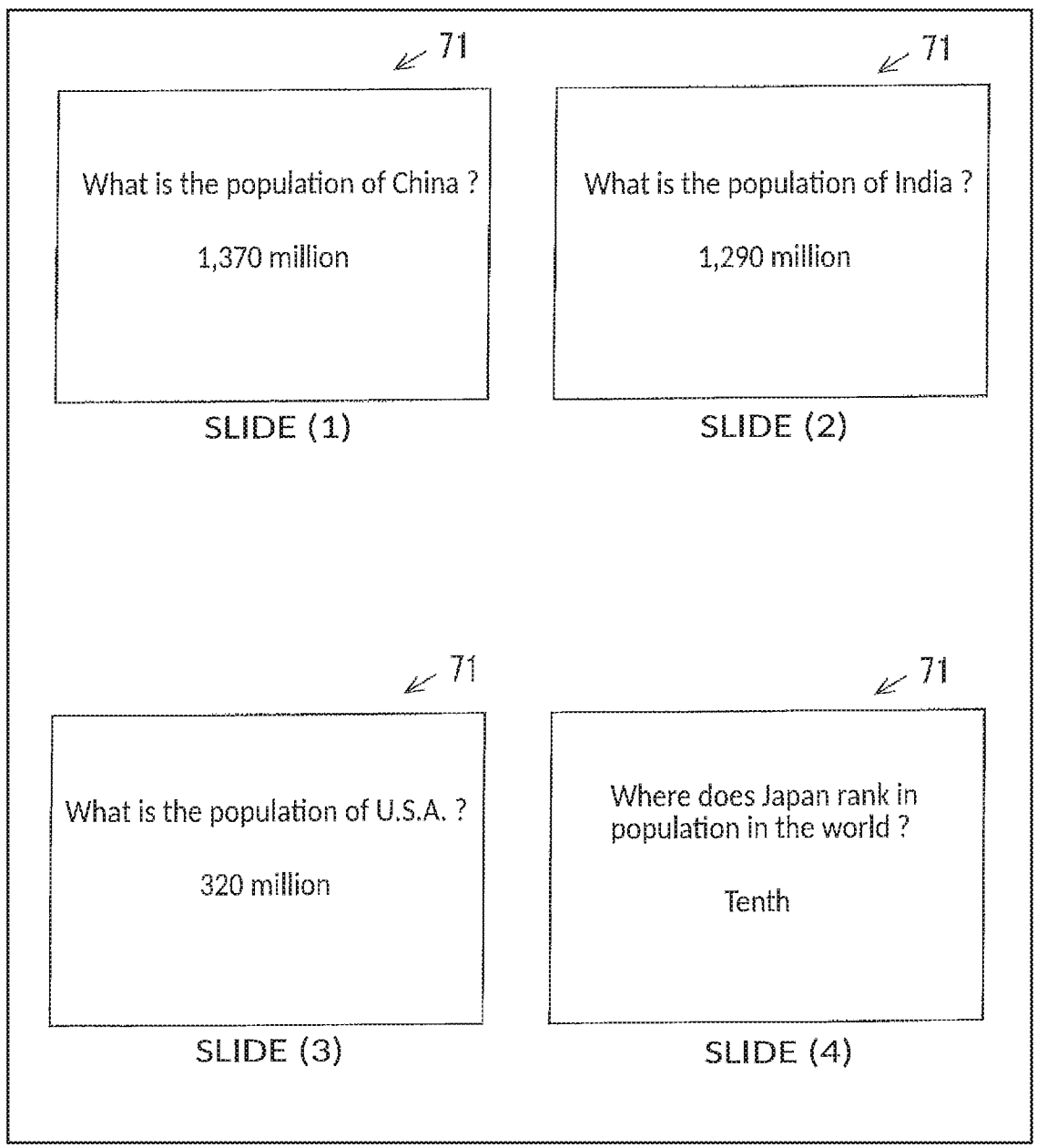
FIG. 20 is a schematic view for showing an example of display data 71 of slides including an object to be displayed later which is located in the same page.

FIG. 19 is a schematic view for showing an example of display data 71 of slides including an object to be displayed later which is located in a blank space X of the next page. In FIG. 19, the object as an operation target data item is included in the blank space X of a slide (2). Accordingly, the audience as recipients cannot see an answer included in the slide (2) when the audience sees a slide (1), and the number of sheets is prevented from increasing. Incidentally, the blank space X is determined with reference to meta information such as a meta letter or a meta file corresponding to the slide (2). When the blank space X is determined, the object as an operation target data item is enlarged or reduced in order that it fits in the area of the blank space X. Arrangement location may be set up in advance to be arranged on the upper left, upper right, lower left, lower right or the like as long as the object is located within the blank space X. FIG. 20 is a schematic view for showing an example of display data 71 of slides including an object to be displayed later which is located in the same page. In FIG. 20, the object as an operation target data item is included in each of slide (1) to (4).

Figure 21:
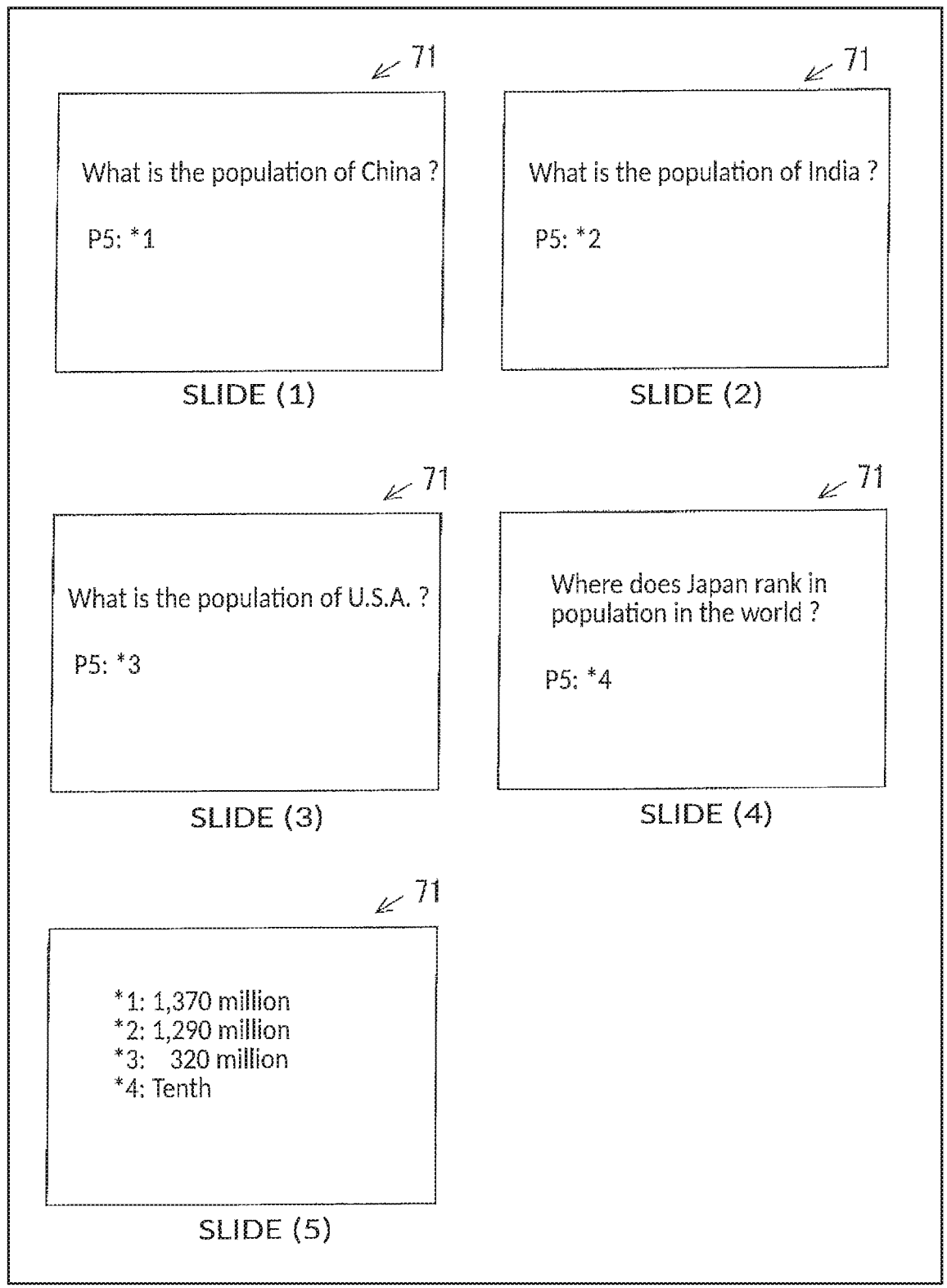
FIG. 21 is a schematic view for showing an example of display data 71 of slides including objects to be displayed later which are contained in another page.

FIG. 21 is a schematic view for showing an example of display data 71 of slides including objects to be displayed later which are contained in another page. In FIG. 21, a slide (5) which is the last page is added as a new page. The objects as operation target data items are enlarged or reduced in accordance with the size of the slide (5), the sizes of the objects and the number of the objects, and aggregated to be arranged in the slide (5). Each of the slides (1) through (4) is given page information of the aggregation target and the reference destination information in the page of the aggregation target. For example, "P5: *1" contained in the slide (1) indicates that the object is aggregated in the slide (5), and that the reference destination of the object is *1. This is true for the slides (2) through (4) Accordingly, the audience as recipients cannot see an answer included in the slide (5) when the audience sees the slides (1) through (4), and the number of sheets is prevented from increasing.

Figure 22:
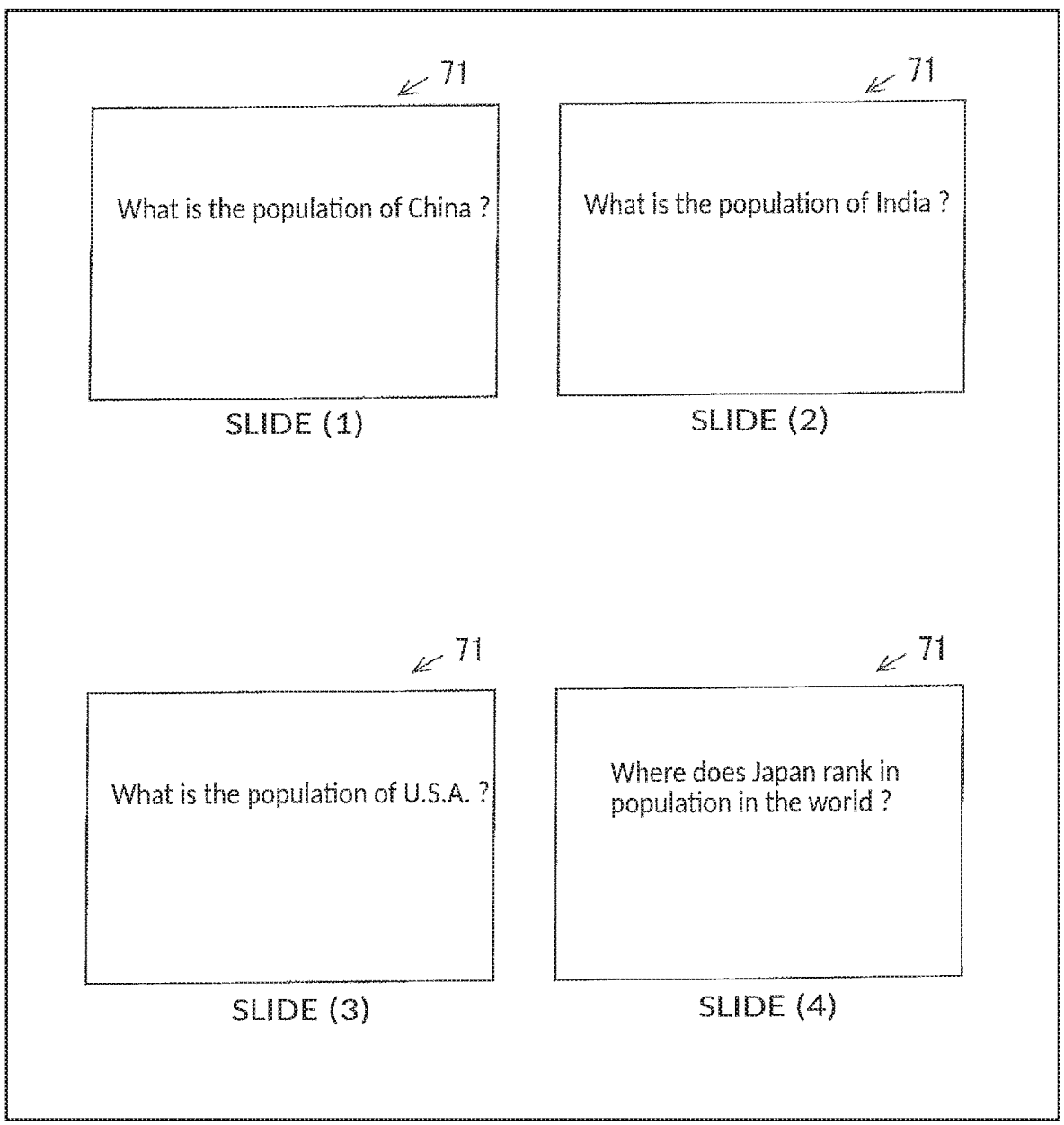
FIG. 22 is a schematic view for showing an example of display data 71 which does not include objects to be displayed later.
Figure 23:
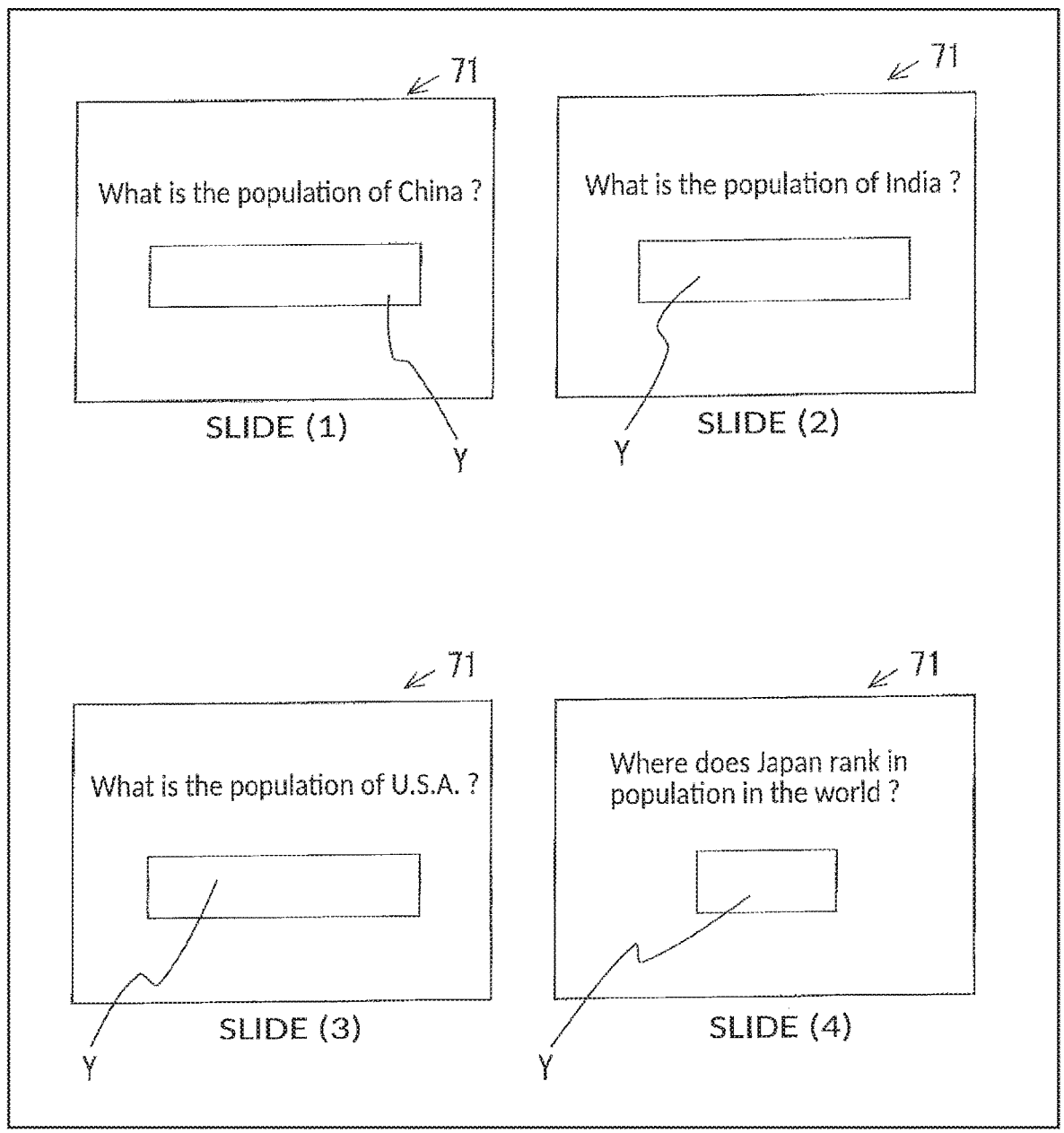
FIG. 23 is a schematic view for showing an example of display data 71 of slides including blank boxes Y in place of objects to be displayed later.

FIG. 22 is a schematic view for showing an example of display data 71 which does not include objects to be displayed later. In FIG. 22, the objects as operation target data items are deleted from the slides (1) through (4). Accordingly, the audience as recipients cannot see an answer when the audience sees the slides (1) through (4). FIG. 23 is a schematic view for showing an example of display data 71 of slides including blank boxes Y in place of objects to be displayed later. In FIG. 23, an object in the form of a blank box Y of a square shape is inserted to each of the slides (1) through (4). Accordingly, the audience as recipients cannot see an answer included in the slide (5) when the audience sees the slides (1) through (4). Incidentally, while the blank box Y illustrated in FIG. 23 is an object in the form of a square, any other appropriate form can be employed such as a circle or an ellipse. Furthermore, the contour line for forming the blank box Y may be made of another line such as broken line in place of solid line. Still further, in place of the blank box Y, unprinted letters, symbols such as parentheses, a QR code (registered trademark), a URL or the like can be used.

Figure 24:
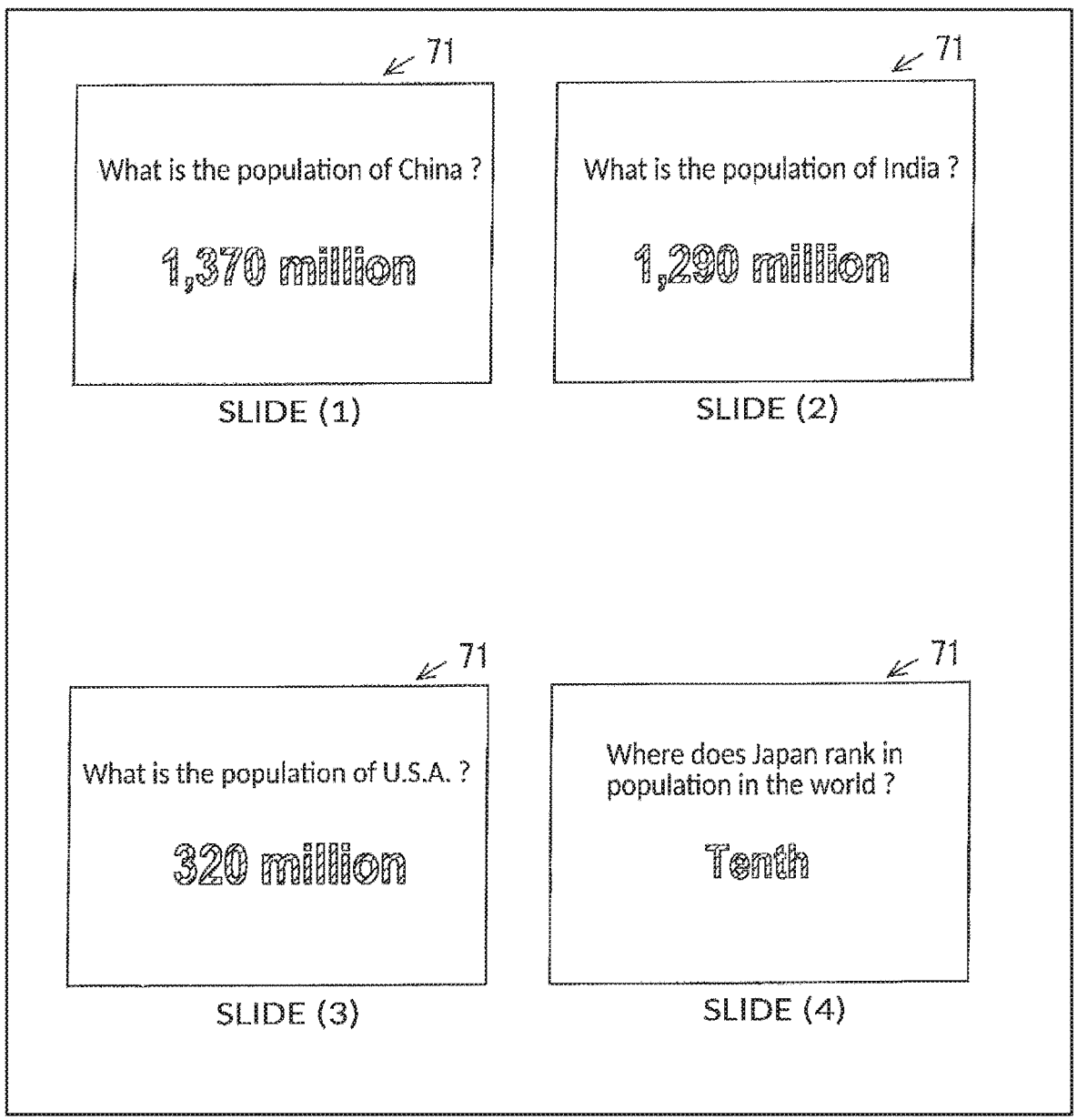
FIG. 24 is a schematic view for showing an example of display data 71 of slides including objects to be displayed later which are edited by decoration.

FIG. 24 is a schematic view for showing an example of display data 71 of slides including objects to be displayed later which are edited by decoration. In FIG. 24, the objects as operation target data items are decorated in the slides (1) through (4) respectively. Specifically, the density of each object as an operation target data item is set to a low value so that the object is illegible at first sight. Accordingly, during presentation by a sender, an audience as recipients mainly watch the slides (1) through (4) projected on a screen so that the audience cannot readily find answers. In this case, the audience can find answers by reviewing a reference which is distributed later. Meanwhile, decoration may be, for example, changing in color, enlarging or reducing, conversion to hologram or the like which makes it possible to visually recognize objects only at a particular angle.

As has been discussed above, in the information processing apparatus 1 according to the present embodiment, the easy-to-read performance of the second display data of electronic data is decreased to be lower than the first display data, and displayed based on another operation target data item, so that it is possible to decrease the easy-to-read performance of particular information and therefore to realize the situation that the particular information is not explicitly indicated to recipients.

Also, the electronic data is generated based on an operation target data item, to which is set animation information, from among the plurality of operation target data items, and can create an apparent motion, so that it is possible to increase variations of expression of references created by a sender.

Furthermore, the motion information included in the animation information is the information specified to change at least part of the plurality of operation target data items over time, and the electronic data is generated based on an operation target data item, to which is set animation information, so that a sender can provide intuitive presentation to recipients.

Still further, the electronic data is generated based on an operation target data item to which is set text information from among operation target data items to which are set animation information so that since an operation target data item can be selected with reference to the text information, it is possible to select an operation target data item in accordance with the correlation based on text.

Still further, some operation target data item is selected based on the first selection information specifying one or more letter from among the operation target data items, and another operation target data item is selected based on the second selection information specifying one or more letter having a complementary meaning to the meaning indicated by the first selection information from among the operation target data items, so that the some operation target data item and the another operation target have a complementary relationship to make it possible to provide recipients with presentation which is expressed by a sender with character strings having the complementary relationship.

Still further, since the easy-to-read performance of the second display data is lowered in terms of at least one of visibility, readability and legibility, it is possible to adjust the easy-to-read performance by a simple method at a low cost.

Still further, since the electronic data is created in the same format as or a different format than the electronic document, it is possible to increase choices of output targets of the electronic data, and therefore to increase choices of presentation environments which can be provided by a sender.

Still further, since the electronic document is created by an office suite, it is possible to increase portability of the edit environment of the electronic document as source data of electronic data by making use of a known application circulated in the market.

The information processing apparatus 1 have been explained based on the embodiments in accordance with the present invention. However, it is not intended to limit the present invention to the precise form described, and obviously many modifications and variations are possible without departing from the spirit and scope of the invention.

Also, while a nonvolatile memory or a magnetic disc storage device is used as the memory 13 which is a recording medium for storing the program to be run by the processor 11 in the above example, the present invention is not limited thereto but an optical disk, an IC card, an optical card, or a semiconductor memory such as a mask ROM, an EPROM (Erasable Programmable ROM) and an EEPROM (Electrically EPROM) can be used instead.

Furthermore, another computer connected through the network interface 21 and not shown in the figure can rewrite the program stored in the memory 13 or add a new program to the memory 13. Furthermore, the information processing apparatus 1 can be structured to download a program from another computer connected through the network interface 21 and not shown in the figure and store the downloaded program in the memory 13. Such programs include not only programs which can be directly run by the one or more processor 11 but also programs in the forms of source programs, compressed programs, encoded programs and so forth.

Incidentally, while the slides have been explained with reference to FIGS. 17 to 24, sheets can be used instead. For example, in the case where sheets are used in the example shown in FIG. 22, an audience can write an answer in the area from which an object corresponding to an answer is deleted. Likewise, an audience can write an answer in the blank box Y shown in FIG. 23. Also, the slides shown in FIGS. 17 to 24 can be prepared in Web pages or as motion pictures such as streaming.

Meanwhile, the series of processes as described above may be performed by hardware or software. In the case where the series of processes are performed by software, various programs of the software are installed in a computer which can realize the above functions by running the various programs, and the various programs can be installed by reading them from a recording medium or downloading them from the Internet.

Although embodiments of the present invention have been described and illustrated in detail, the disclosed embodiments are made for purposes of illustration and example only and not limitation. The scope of the present invention should be interpreted by terms of the appended claims.

What is claimed is:

1. An information processing apparatus which processes an electronic document including a plurality of operation target data items to be operated, the information processing apparatus comprising:
   at least one hardware processor which is configured to control the electronic document; and
   a memory which stores an interpreter module;
   wherein:

the at least one hardware processor performs the interpreter module stored in the memory, the interpreter module includes a first acquisition instruction which is used to acquire edit information of the plurality of operation target data items, a second acquisition instruction which is used to acquire relevance information of the plurality of operation target data items, and a generation instruction which is used to generate electronic data from the electronic document based on the edit information acquired by the first acquisition instruction and the relevance information acquired by the second acquisition instruction, the memory stores, in advance, a plurality of pairs of relevance information items, wherein each pair includes a first selection information item and a second selection information item which is associated with the first selection information item, and wherein, for each pair, the second selection information item is different from the associated first selection information item and has a complementary relationship to the associated first selection information item, the interpreter module compares the acquired relevance information of the plurality of operation target data items with the plurality of pairs of relevance information items which are stored in advance in the memory, and selects, based on the comparison, a first operation target data item from among the plurality of operation target data items and a second operation target data item from among the plurality of operation target data items which is different from the first operation target data item and which has a complementary relationship to the first operation target data item, wherein the interpreter module selects, as the first operation target data item, an operation target data item that matches or has the same meaning as one of the first selection information items stored in advance, and the interpreter module selects, as the second operation target data item, an operation target data item that matches or has the same meaning as the second selection information item that is associated with the first selection information item used to select first operation target data item, and the electronic data is used as display data and includes first display data which is displayed based on the selected first operation target data item, and second display data which is displayed based on the selected second operation target data item in order that easy-to-read performance of the second display data is decreased to be lower than the first display data.

2. The information processing apparatus of claim 1, wherein:

the edit information includes animation information which can be set to each of the plurality of operation target data items to create an apparent motion, and the electronic data is generated based on an operation target data item, to which animation information is set, from among the plurality of operation target data items.

3. The information processing apparatus of claim 2, wherein:

the animation information includes display order information which specifies a display order for displaying the plurality of operation target data items respectively, and motion information which specifies motions of the plurality of operation target data items, the display order of which are set based on the display order information, and the motion information is information specified to change at least part of the plurality of operation target data items over time.

4. The information processing apparatus of claim 2, wherein:

the edit information includes attribute information of each of the plurality of operation target data items, the attribute information indicates whether or not at least the plurality of operation target data items include text information, and the electronic data is generated based on an operation target data item which includes text information, from among the operation target data items to which the animation information is set.

5. The information processing apparatus of claim 4, wherein:

the interpreter module selects, as the first operation target data item, an operation target data item including one or more letters that match or have the same meaning as said one of the first selection information items stored in advance in the memory, and the interpreter module selects, as the second operation target data item, an operation target data item including one or more letters that matches or has the same meaning as the second selection information item that is associated with the first selection information item used to select the first operation target data item, said one or more letters of the second operation target data item having a complementary meaning to a meaning indicated by the first selection information item used to select the first operation target data item.

6. The information processing apparatus of claim 5, wherein:

the display data is used to display at least one of text, a numeral or a punctuation mark as a display letter, the easy-to-read performance of the second display data is lowered in terms of at least one of visibility, readability and legibility, the visibility is determined based on differences between display letters and the background color of the display letters in at least one of brightness, saturation and hue, the readability is determined based on at least one of a size of the display letters, a space between the display letters, and a shape of the display letters, and the legibility is determined at least based on a style of the display letters.

7. The information processing apparatus of claim 1, wherein the electronic data is created in a same format as or a different format than the electronic document.

8. The information processing apparatus of claim 1, wherein the electronic document is created by an office suite.

* * * * *